(12) United States Patent
Lee et al.

(10) Patent No.: US 10,952,169 B2
(45) Date of Patent: Mar. 16, 2021

(54) SIGNAL TRANSMITTING/RECEIVING METHOD AND APPARATUS

(71) Applicant: Samsung Electronics Co., Ltd, Gyeonggi-do (KR)

(72) Inventors: Dae-Young Lee, Gyeonggi-do (KR); Chul-Woo Byeon, San Diego, CA (US); Ju-Ho Son, Seoul (KR); Jeong-Ho Lee, Gyeonggi-do (KR); Sun-Kyu Choi, Gyeonggi-do (KR); Sung-Tae Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/511,621

(22) PCT Filed: Sep. 15, 2015

(86) PCT No.: PCT/KR2015/009656
§ 371 (c)(1),
(2) Date: Mar. 15, 2017

(87) PCT Pub. No.: WO2016/043487
PCT Pub. Date: Mar. 24, 2016

(65) Prior Publication Data
US 2017/0257837 A1    Sep. 7, 2017

(30) Foreign Application Priority Data

Sep. 15, 2014   (KR) .................... 10-2014-0121823

(51) Int. Cl.
*H04W 56/00*    (2009.01)
*H04J 4/00*    (2006.01)
(Continued)

(52) U.S. Cl.
CPC .... *H04W 56/0015* (2013.01); *G06F 13/4273* (2013.01); *G08C 17/00* (2013.01);
(Continued)

(58) Field of Classification Search
CPC . H04B 1/7174; H04B 1/7183; H04L 25/4902; H04L 25/4904
See application file for complete search history.

(56) References Cited

U.S. PATENT DOCUMENTS 1,971,044 A * 8/1934 Lewis .................... B41N 1/12
                                                    101/401.1
2,426,223 A * 8/1947 Katchatouroff ........ H04M 11/06
                                                    379/100.17

(Continued)

FOREIGN PATENT DOCUMENTS

CN     1943153 A     4/2007
CN     1943153 A *   4/2007
(Continued)

OTHER PUBLICATIONS

International Search Report dated Jan. 22, 2016 in connection with International Application No. PCT/KR2015/009656, 5 pages.
(Continued)

*Primary Examiner* — Berhanu Tadese

(57) ABSTRACT

The present invention relates to a 5th-generation (5G) or pre-5G communication system to be provided in order to support a higher data transmission rate than a beyond 4th-generation (4G) communication system such as long term evolution (LTE). The present invention relates to a signal transmission method of a radio frequency (RF) processing device, the method comprising the steps of: generating a pulse signal including a control signal and a clock signal for obtaining synchronization with another RF processing device, which is connected through an interface; and transmitting, to the another RF processing device, at least (Continued)

one from among the pulse signal, a RF signal for communication with a base station, and a power signal for supplying power to the another RF processing device, wherein the clock signal and the control signal are assigned to different time units, and the pulse signal, the RF signal and the power signal are signals of different frequency bands.

16 Claims, 12 Drawing Sheets

(51) Int. Cl.
  G06F 13/42    (2006.01)
  H04L 5/26     (2006.01)
  G08C 17/00    (2006.01)
  H04B 3/54     (2006.01)
  H04B 14/02    (2006.01)
  H04B 1/00     (2006.01)
  H04L 7/00     (2006.01)
  H04W 84/04    (2009.01)

(52) U.S. Cl.
  CPC ............. *H04B 1/005* (2013.01); *H04B 3/548* (2013.01); *H04B 14/026* (2013.01); *H04J 4/00* (2013.01); *H04L 5/26* (2013.01); *H04L 7/0008* (2013.01); *H04W 84/042* (2013.01)

(56) References Cited

U.S. PATENT DOCUMENTS

| | | | | |
|---|---|---|---|---|
| 3,150,320 A * | 9/1964 | Gruenberg | H04B 7/2043 | 342/353 |
| 3,193,474 A * | 7/1965 | Gore | C25D 3/56 | 205/137 |
| 3,546,701 A * | 12/1970 | Kurth | H03C 3/09 | 327/156 |
| 4,167,699 A * | 9/1979 | Baker | G01P 21/02 | 324/166 |
| 4,310,801 A * | 1/1982 | Baker | G01C 22/02 | 327/294 |
| 5,323,438 A * | 6/1994 | Kim | G06F 1/025 | 377/54 |
| 5,430,711 A * | 7/1995 | Yamada | H04J 1/06 | 370/206 |
| 5,504,457 A * | 4/1996 | Jensen | H03G 1/04 | 330/129 |
| 5,555,096 A * | 9/1996 | Yoo | H04N 9/7976 | 386/202 |
| 5,923,701 A * | 7/1999 | Nakamura | H04L 25/4902 | 332/112 |
| 6,066,982 A * | 5/2000 | Ohtani | H03K 9/04 | 329/313 |
| 6,219,380 B1 * | 4/2001 | Wang | H03K 7/04 | 329/313 |
| 7,079,589 B1 * | 7/2006 | Maksimovic | H04L 25/4902 | 375/295 |
| 7,292,656 B2 * | 11/2007 | Kloper | G01R 23/16 | 375/224 |
| 7,430,199 B2 * | 9/2008 | Fujita | H04B 1/7183 | 370/350 |
| 7,558,348 B1 * | 7/2009 | Liu | H04B 1/40 | 327/310 |
| 7,817,742 B2 * | 10/2010 | Suematsu | G06K 17/0022 | 375/295 |
| 7,830,953 B2 * | 11/2010 | Fujiwara | H04B 1/7183 | 375/149 |
| 8,180,384 B1 * | 5/2012 | Khlat | H04W 56/0045 | 370/350 |
| 8,670,322 B2 | 3/2014 | Yehezkely et al. | | |
| 8,805,272 B2 * | 8/2014 | Kawamura | G06K 19/07749 | 455/11.1 |
| 9,641,312 B1 * | 5/2017 | Fischer | H04L 7/0066 | |
| 10,284,364 B2 * | 5/2019 | Park | H04L 25/02 | |
| 2005/0058012 A1 * | 3/2005 | Yamauchi | G11C 7/1078 | 365/233.1 |
| 2005/0276310 A1 * | 12/2005 | Choi | H04B 1/7176 | 375/130 |
| 2006/0038658 A1 * | 2/2006 | Jarvis | G06K 7/0008 | 340/10.1 |
| 2006/0218455 A1 * | 9/2006 | LeClair | G11C 29/028 | 714/726 |
| 2007/0060079 A1 | 3/2007 | Nakagawa et al. | | |
| 2007/0251560 A1 * | 11/2007 | Moore | A61H 3/02 | 135/66 |
| 2007/0297487 A1 | 12/2007 | Mimura et al. | | |
| 2008/0037665 A1 * | 2/2008 | Maeki | H04W 16/16 | 375/260 |
| 2008/0100346 A1 * | 5/2008 | Kim | H03K 9/08 | 327/37 |
| 2008/0267311 A1 * | 10/2008 | Sakata | H04B 7/12 | 375/267 |
| 2009/0021309 A1 * | 1/2009 | Zheng | H03K 5/07 | 330/306 |
| 2009/0041169 A1 * | 2/2009 | Fujita | H04L 25/4902 | 375/354 |
| 2009/0129460 A1 * | 5/2009 | Nakasha | H04B 1/7163 | 375/238 |
| 2009/0232197 A1 * | 9/2009 | Mimura | H04B 1/7183 | 375/239 |
| 2010/0253386 A1 * | 10/2010 | Jang | H03K 19/0002 | 326/31 |
| 2011/0037863 A1 | 2/2011 | Mihota et al. | | |
| 2011/0058601 A1 * | 3/2011 | Kim | H03F 1/0266 | 375/238 |
| 2011/0222480 A1 * | 9/2011 | Perigo | H04W 16/26 | 370/328 |
| 2012/0049916 A1 * | 3/2012 | Tsai | G04R 40/04 | 327/160 |
| 2012/0106674 A1 * | 5/2012 | Lee | H04L 5/0064 | 375/296 |
| 2012/0207195 A1 | 8/2012 | Kawasaki et al. | | |
| 2012/0299659 A1 * | 11/2012 | Sankalp | H03F 1/0288 | 330/296 |
| 2012/0309325 A1 * | 12/2012 | Carbone | H04B 1/40 | 455/73 |
| 2013/0101013 A1 * | 4/2013 | Kim | H04L 1/007 | 375/239 |
| 2013/0101056 A1 * | 4/2013 | Ahn | H03F 3/2171 | 375/257 |
| 2014/0321223 A1 * | 10/2014 | Riho | G11C 7/10 | 365/191 |
| 2014/0369444 A1 * | 12/2014 | Park | H04L 27/22 | 375/302 |
| 2015/0270740 A1 * | 9/2015 | Lee | H02J 50/80 | 320/108 |
| 2016/0197560 A1 * | 7/2016 | Leedham | H04L 12/40013 | 363/78 |
| 2016/0211884 A1 * | 7/2016 | Nakasha | H04B 1/717 | |
| 2017/0214519 A1 * | 7/2017 | Park | H04L 25/02 | |
| 2017/0257837 A1 * | 9/2017 | Lee | H04L 7/0008 | |

FOREIGN PATENT DOCUMENTS

| | | | | |
|---|---|---|---|---|
| CN | 101053156 A | | 10/2007 | |
| CN | 103776486 A | | 5/2014 | |
| EP | 1971044 A1 * | | 9/2008 | ............... H04L 1/04 |
| EP | 3193474 A1 * | | 7/2017 | ......... H04W 56/005 |
| EP | 3193474 A4 * | | 9/2017 | ........... H04B 7/0413 |
| EP | 3193474 B1 * | | 6/2018 | ......... H04W 56/001 |
| JP | 2007071819 A | | 3/2007 | |
| JP | 2007071819 A * | | 3/2007 | ............ H04J 3/0682 |
| JP | 2009523402 A | | 6/2009 | |
| KR | 20090041169 A * | | 4/2009 | ............ H04N 19/593 |
| WO | WO-2007071819 A1 * | | 6/2007 | ........ H04L 27/2601 |
| WO | WO-2016043487 A1 * | | 3/2016 | ............... H04L 5/26 |
| WO | WO-2017028656 A1 * | | 2/2017 | ............. D04H 13/00 |

(56) References Cited

FOREIGN PATENT DOCUMENTS

WO     WO-2017082797 A1 *   5/2017     ......... H04L 27/2602
WO     WO-2018026689 A1 *   2/2018     ............. H01C 1/028

OTHER PUBLICATIONS

European Patent Office, "Communication pursuant to Article 94(3) EPC," Application No. 15841821.0, dated Sep. 25, 2018, 6 pages.
China National Intellectual Property Administration, "The First Office Action," Application No. CN 2015800579498, dated Nov. 1, 2018, 20 pages.
European Patent Office, "Supplementary European Search Report," Application No. EP 15841821.0, dated Oct. 23, 2017, 5 pages.

* cited by examiner

MONO-PULSE   BI-PULSE   MULTI-PERIOD PULSE

SIGNAL TRANSMITTING/RECEIVING METHOD AND APPARATUS

CROSS-REFERENCE TO RELATED APPLICATION(S)

The present application claims priority under 35 U.S.C. § 365 to International Patent Application No. PCT/KR2015/009656 filed Sep. 15, 2015, entitled "SIGNAL TRANSMITTING/RECEIVING METHOD AND APPARATUS", and, through International Patent Application No. PCT/KR2015/009656, to Korean Patent Application No. 10-2014-0121823 filed Sep. 15, 2014, each of which are incorporated herein by reference into the present disclosure as if fully set forth herein.

TECHNICAL FIELD

The present invention relates to signal transmission/reception methods and apparatuses.

BACKGROUND

In order to meet the demand for wireless data traffic soring since the fourth-generation (4G) communication system came to the market, there are ongoing efforts to develop enhanced fifth-generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on millimeter wave (mmWave) bands, such as, e.g., a 60 GHz band. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

Other techniques being developed for 5G system are among hybrid frequency shift keying (FSK) and quadrature amplitude modulation (QAM) (FQAM) and sliding window superposition coding (SWSC), as advanced coding modulation (ACM) schemes, and filter bank multi-carrier (FBMC), non-orthogonal multiple access (NOMA), and sparse code multiple access (SCMA), as advanced access techniques.

The demand for high-speed data transmission through wireless cellular communication is in a continuous increasing trend. Adopting carrier aggregation in legacy 4G long-term evolution (LTE) wireless communication system enables data communication to be carried out at a speed theoretically up to 100 Mbps, which allows ubiquitous high-speed communication.

Recently, more demand exists for Gbps or higher, ultra-high speed data communication for the purpose of cloud computing or ultra-high definition (UHD) video data transmission, leading to the development of techniques to support Gbps or higher data transmission in next-generation communication.

The current cellular band, i.e., 5 GHz or lower band, has saturated. Thus, there is no other choice but to use the mmWave band, which has not been used for legacy cellular communication, in order to support 5 Gbps or higher wide-band communication. The mmWave band, by its high-frequency nature, requires that the system be implemented in quite a different fashion than in the legacy cellular communication scheme. Thus, a new different method from the legacy one should be conceived in light of the optimization of the overall system.

Meanwhile, a wireless communication unit (e.g., a radio frequency integrated circuit (RFIC) for mmWave band communication purposes) is placed in a few separate units in the terminal due to mountability issues. In this case, it is critical to use a minimum number of cables (or transmission lines) to enable transmission and reception of various signals (e.g., direct-current (DC) power signals, clock signals, control signals, and radio frequency (RF)/intermediate frequency (IF) signals) between the multiple wireless communication units. According to the conventional art, such a method has been used that the signals are divided by a frequency division scheme and are then subject to transmission and reception.

In such case, however, the frequency selector to divide each signal based on frequency becomes complicated in design. In other words, if the number of signals to be transmitted through the cables increases in the frequency selector which is materially related to a design considering inter-signal interference, the design difficulty and complexity would grow exponentially.

Further, clock signals, which should inevitably be transmitted and reach generally a few tends or a few hundreds of MHz, cause the frequency selector to be bulkier than mmWave signals would. Moreover, upon differentiating the clock signals, phase variations in the clock signals may increase jitter. Thus, a need exists for an approach for enabling more efficient signal transmission and reception between the multiple wireless communication units.

Meanwhile, the above-described information is provided only as background information for a better understanding of the present invention. No determinations and claims are made as to whether what has been described in this section may be applicable as the prior art related to the present invention.

SUMMARY

According to an embodiment of the present invention, there are proposed a method and apparatus for transmitting and receiving signals.

According to an embodiment of the present invention, there are proposed a signal transmission/reception method and apparatus capable of reducing complexity by distinctively transmitting/receiving multiple signals.

According to an embodiment of the present invention, there are proposed a method and apparatus that transmits/receives control signals and clock signals based on time division multiple access (TDMA) and DC power signals and RF/IF signals based on frequency division multiple access (FDMA).

According to an embodiment of the present invention, there are proposed a method and apparatus capable of reducing interference with signals transmitted/received through other frequency bands by transmitting control signals and clock signals on a pulse basis and enabling various pulse symbols to be used considering, e.g., data transmission speed and power consumption.

According to an embodiment of the present invention, a method of transmitting a signal by a radio frequency (RF) processing apparatus comprises the steps of generating a pulse signal including a control signal and a clock signal for obtaining a sync with another RF processing apparatus connected via one interface and transmitting at least one of the pulse signal, a RF signal for communication with a base station, and a power signal for supplying power to the other RF processing apparatus to the other RF processing apparatus, wherein the clock signal and the control signal are assigned to different time units, and wherein the pulse signal, the RF signal, and the power signal are signals of different frequency bands.

According to an embodiment of the present invention, another method of receiving a signal by a radio frequency (RF) processing apparatus comprises the step of receiving, from another RF processing apparatus connected via one interface, at least one of a pulse signal including a control signal and a clock signal for obtaining a sync with the other RF processing apparatus, a RF signal for communication with a base station, and a power signal for supplying power to the RF processing apparatus, wherein the clock signal and the control signal are assigned to different time units, and wherein the pulse signal, the RF signal, and the power signal are signals of different frequency bands.

According to an embodiment of the present invention, a radio frequency (RF) processing apparatus comprises a pulse signal generator generating a pulse signal including a control signal and a clock signal for obtaining a sync with another RF processing apparatus connected via one interface and a transmitter transmitting at least one of the pulse signal, a RF signal for communication with a base station, and a power signal for supplying power to the other RF processing apparatus to the other RF processing apparatus, wherein the clock signal and the control signal are assigned to different time units, and wherein the pulse signal, the RF signal, and the power signal are signals of different frequency bands.

According to an embodiment of the present invention, a radio frequency (RF) processing apparatus comprises a receiver receiving, from another RF processing apparatus connected via one interface, at least one of a pulse signal including a control signal and a clock signal for obtaining a sync with the other RF processing apparatus, a RF signal for communication with a base station, and a power signal for supplying power to the RF processing apparatus, wherein the clock signal and the control signal are assigned to different time units, and wherein the pulse signal, the RF signal, and the power signal are signals of different frequency bands.

Other aspects, advantages, and core features of the present invention will be apparent to one of ordinary skill in the art from the following detailed description of exemplary embodiments of the present invention, taken into conjunction with the drawings.

Prior to going into the detailed description of the disclosure, it might be effective to define particular words and phrases as used herein. As used herein, the words "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to," be bound to or with, "have, or "have a property of" As used herein, the word "controller" may mean any device, system, or part thereof controlling at least one operation. The device may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

BRIEF DESCRIPTION OF THE DRAWINGS

Particular preferred embodiments of the present invention and the foregoing and other aspects, features, and advantages will be apparent from the following detailed description taken in conjunction with the accompanying drawings, wherein.

It should be noted that the same or similar reference denotations may be used to refer to the same or similar elements, features, or structures throughout the drawings.

DETAILED DESCRIPTION

Figure 1:
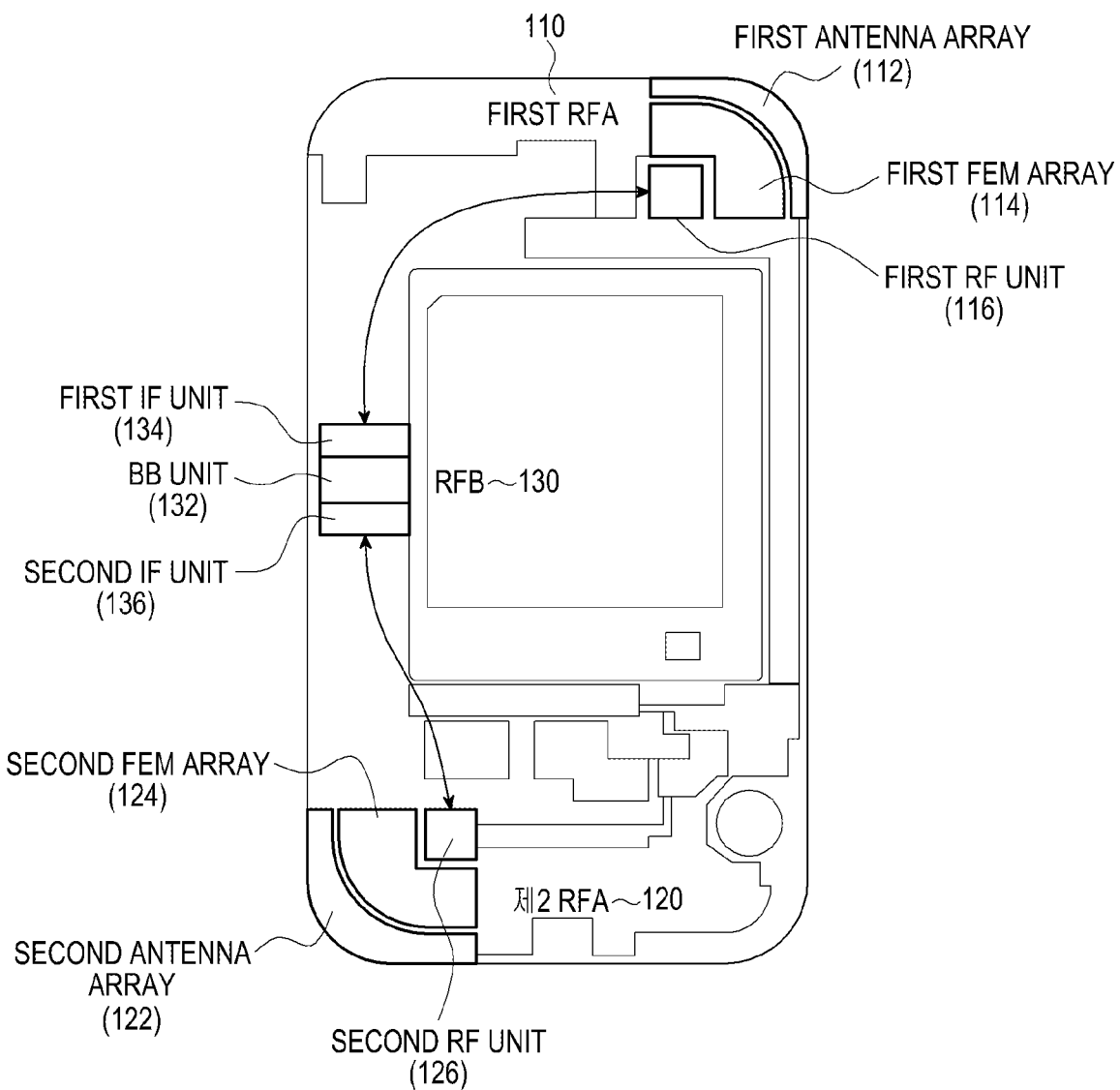
FIG. 1 is a view schematically illustrating the internal structure of a wireless communication unit in a terminal according to an embodiment of the present invention.

The following detailed description taken in conjunction with the accompanying drawings is provided for a comprehensive understanding of various embodiments of the present invention which are defined by the appended claims or equivalents thereof. However, various particular matters set forth below in the detailed description should be regarded simply as examples. Hence, it should be appreciated by one of ordinary skill in the art that various changes or modifications may be made to the embodiments without departing from the spirit or scope of the present invention. Known functions and components related to the present invention may be excluded from the description for clarity and brevity.

The terms and words used herein should not be interpreted as limited to their literal meanings, and it should be noted that they are rather provided merely for a clear and consistent understanding of the present invention. Thus, it is apparent to one of ordinary skill in the art that the detailed description of various embodiments of the present invention is intended for description purposes alone, but not for limiting the subject matter of the present invention defined by the appended claims and equivalents thereof.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present invention. The term "and/or" may denote a combination(s) of a plurality of related items as listed or any of the items.

The terms as used herein are provided merely to describe some embodiments thereof, but not to limit the present invention. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present invention belong. Such terms as those generally defined in the dictionary should be appreciated to be consistent with contextual meanings of relevant technology.

According to an embodiment of the present invention, the terminal may include communication functionality. For example, the terminal may be a smartphone, a tablet PC, a personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the invention, the terminal may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™, a gaming console, an electronic dictionary, a camcorder, or an electronic picture frame.

According to various embodiments of the invention, the terminal may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the invention, the terminal may be a piece of furniture, part of a building/structure, an electronic board, an electronic signature receiving device, a projector, or various measurement devices (e.g., devices for measuring water, electricity, gas, or electromagnetic waves) which have communication functionality.

According to various embodiments of the invention, the terminal may be a combination of the above-listed devices. It should be appreciated by one of ordinary skill in the art that the terminal is not limited to the above-described devices.

According to an embodiment of the present invention, there are proposed a method and apparatus for transmitting and receiving signals.

According to an embodiment of the present invention, there are proposed a signal transmission/reception method and apparatus capable of reducing complexity by distinctively transmitting/receiving multiple signals.

According to an embodiment of the present invention, there are proposed a method and apparatus that transmits/receives control signals and clock signals based on time division multiple access (TDMA) and DC power signals and radio frequency (RF)/intermediate frequency (IF) signals based on frequency division multiple access (FDMA).

According to an embodiment of the present invention, there are proposed a method and apparatus capable of reducing interference with signals transmitted/received through other frequency bands by transmitting control signals and clock signals on a pulse basis and enabling various pulse symbols to be used considering, e.g., data transmission speed and power consumption.

Meanwhile, an apparatus and method as proposed according to an embodiment of the present invention may be applicable to various communication systems, such as long-term evolution (LTE) mobile communication systems, long-term evolution-advanced (LTE-A) mobile communication systems, licensed-assisted access (LAA)-LTE mobile communication system, high speed downlink packet access (HSDPA) mobile communication systems, high speed uplink packet access (HSUPA) mobile communication systems, 3rd generation project partnership 2 (3GPP2) high rate packet data (HRPD) mobile communication systems, 3GPP2 wideband code division multiple access (WCDMA) mobile communication systems, 3GPP2 code division multiple access (CDMA) mobile communication systems, Institute of electrical and electronics engineers (IEEE) 802.16ad communication systems, IEEE 802.16m communication systems, IEEE 802.16e communication system, evolved packet systems (EPSs), and mobile Internet protocol (Mobile IP) systems.

First, the internal structure of a wireless communication unit in a terminal according to an embodiment of the present invention is described with reference to FIG. 1.

FIG. 1 is a view schematically illustrating the internal structure of a wireless communication unit in a terminal according to an embodiment of the present invention.

Referring to FIG. 1, the terminal may largely include a component processing a high-frequency signal (hereinafter, "RFA") and a component processing an IF signal obtained by converting a high-frequency signal into a low-frequency signal and modulating the low-frequency signal according to a preset modulation scheme (hereinafter, "RFB").

The terminal may include multiple RFAs to use multiple input-multiple output (MIMO) technology. FIG. 1 shows an example in which the terminal includes two RFAs (i.e., a first RFA 110 and a second RFA 120). The first RFA 110 and the second RFA 120 are positioned apart from each other at a predetermined interval in the terminal. Thus, as shown in FIG. 1, the first RFA 110 and the second RFA 120, respectively, are positioned at an upper and left corner and lower and right corner of the terminal, so that the first RFA 110 and the second RFA 120 may be positioned on a diagonal line of the terminal.

The first RFA 110 and the second RFA 120 are components for high-frequency communication and enable signal transmission and reception through an antenna. The first RFA 110 includes a first antenna 112 serving as an interface with an air medium, a first front end module (FEM) 114 receiving a signal from the first antenna 112 or transferring a signal to the first antenna 112, and a first RF unit 116 for interfacing with the RFB 130.

The second RFA 120 includes a second antenna 122 serving as an interface with an air material, a second FEM 124 receiving a signal from the second antenna 122 or transferring a signal to the second antenna 122, and a second RF unit 126 for interfacing with the RFB 130.

The first antenna 112 and the second antenna 122 each may be configured in the form of an array in which case the first FEM 114 and the second FEM 124 may also be configured in the form of an array that forms a one-to-one correspondence with each antenna.

The RFB 130 includes a baseband (BB) unit 132, and a first IF unit 134 and a second IF unit 136 respectively connected with the first RFA 110 and the second RFA 120. The BB unit 132 generates a digital signal and transfers the generated digital signal to the first IF unit 134 and the second IF unit 136. The first IF unit 134 and the second IF unit 136 each converts the received digital signal into an analog signal and modulates the analog signal to facilitate propagation through the air medium. The first IF unit 134 and the second IF unit 136 transfer the modulated signal to the first RFA 110 and the second RFA 120, respectively.

The first RFA 110 (or the second RFA 120) and the RFB 130 may be connected together via one interface (e.g., a cable or transmission line—hereinafter, an example is described where they are connected via a cable). In this case, the RFB 130 may transmit, to the first RFA 110 through the cable, at least one of a direct current (DC) power signal for supplying power to the first RFA 110, a clock signal for syncing with the first RFA 110, a control signal for controlling the first RFA 110, and a RF/IF signal (uplink/downlink signal) for communication with a base station.

Figure 2:
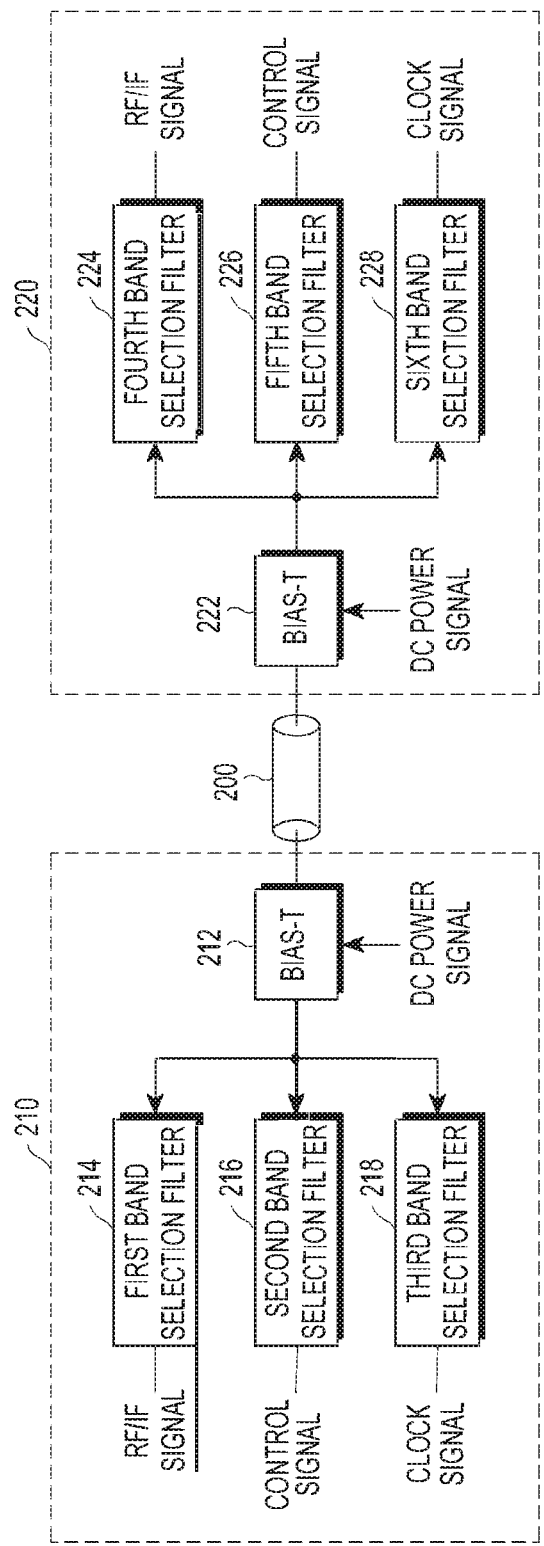
FIG. 2 is a view schematically illustrating frequency selectors included in a RFA and a RFB.

Here, where a normal signal transmission/reception method is used in which the DC power signal, the clock signal, the control signal, and the RF/IF signal are transmitted and received based on a frequency division scheme, the RFA and the RFB each may include a frequency selector configured as shown in FIG. 2.

FIG. 2 is a view schematically illustrating frequency selectors included in a RFA and a RFB.

Referring to FIG. 2, the RFA and the RFB are connected together via one cable 200, and each includes a first frequency selector 210 and a second frequency selector 220 each of which includes filters capable of differentiating the direct current (DC) power signal, the clock signal, the control signal, and the RF/IF signal.

Figure 3:
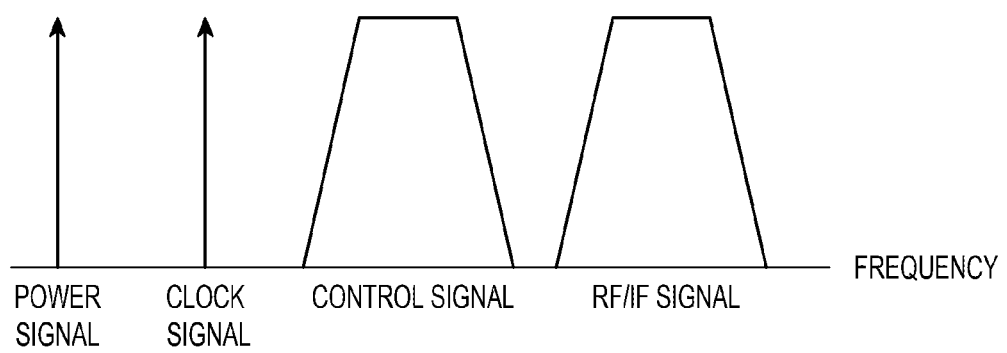
FIG. 3 is a graph illustrating the frequency band of a DC power signal, a clock signal, a control signal, and a RF/IF signal.

As shown in FIG. 3, in a case where the DC power signal, clock signal, control signal, and RF/IF signal are signals of different frequency bands, the first frequency selector 210 may include a bias-T 212 capable of detecting the DC power signal, a first band selection filter 214 capable of detecting the RF/IF signal, a second band selection filter 216 capable of detecting the control signal, and a third band selection filter 218 capable of detecting the clock signal. Here, FIG. 3 is a graph illustrating the frequency band of a DC power signal, a clock signal, a control signal, and a RF/IF signal.

The second frequency selector 220 may include a bias-T 222 capable of detecting the DC power signal, a fourth band selection filter 224 capable of detecting the RF/IF signal, a fifth band selection filter 226 capable of detecting the control signal, and a sixth band selection filter 228 capable of detecting the clock signal.

Thus, where a signal containing at least one of the DC power signal, clock signal, control signal, and RF/IF signal is transmitted from the RFA through the cable 200, the RFB may use at least one of the bias-T 222, the fourth band selection filter 224, the fifth band selection filter 226, and the sixth band selection filter 228 to detect at least one of the DC power signal, clock signal, control signal, and RF/IF signal from the received signal.

Further, where a signal containing at least one of the DC power signal, clock signal, control signal, and RF/IF signal is transmitted from the RFB through the cable 200, the RFA may use at least one of the bias-T 212, the first band selection filter 214, the second band selection filter 216, and the third band selection filter 218 to detect at least one of the DC power signal, clock signal, control signal, and RF/IF signal from the received signal.

Meanwhile, although FIG. 2 illustrates that the frequency selectors included in the RFA and the RFB are implemented as separate units, such as the first frequency selector 210 and the second frequency selector 220, the frequency selectors included in the RFA and the RFB may also be implemented in a single processor.

Further, although FIG. 2 illustrates the case where the first frequency selector 210 is implemented in separate units, such as the bias-T 212, the first band selection filter 214, the second band selection filter 216, and the third band selection filter 218, the first frequency selector 210 may also be implemented so that at least two of the bias-T 212, the first band selection filter 214, the second band selection filter 216, and the third band selection filter 218 are integrated together. Further, the first frequency selector 210 may also be implemented in a single processor.

Further, although FIG. 2 illustrates the case where the second frequency selector 220 is implemented in separate units, such as the bias-T 222, the fourth band selection filter 224, the fifth band selection filter 226, and the sixth band selection filter 228, the second frequency selector 220 may also be implemented so that at least two of the bias-T 222, the fourth band selection filter 224, the fifth band selection filter 226, and the sixth band selection filter 228 are integrated together. Further, the second frequency selector 220 may also be implemented in a single processor.

Meanwhile, a method of transmitting signals of different frequency bands via one cable 200 to thus divide the signals based on a frequency division scheme requires that inter-signal interference be minimized. Thus, as the number of signals to be transmitted increases, the design complexity and difficulty of the frequency selector sharply increase. For example, where signals of N frequency bands are transmitted, the number of interferences that should be considered in the frequency is 2N.

Further, the clock signal has a lower frequency, generally a few tends or a few hundreds of MHz, than the other signals, requiring a larger size of frequency selector. Further, upon detecting the clock signal, jitter increases due to a phase variation in the clock signal.

Further, the filter is designed considering interference between signals when differentiating multiple signals. The control signal is a digital signal having a higher power level as compared with the other signals and thus causes interference or electromagnetic interference (EMI). Thus, reducing the power level of the control signal should be taken into account.

Resultantly, the use of a signal transmission/reception method based on a general frequency division scheme in the terminal including the RFA and the RFB connected via one cable as shown in FIG. 1 requires several factors to be considered, which poses limitations on an actual implementation.

Thus, according to an embodiment of the present invention, there are proposed a method and apparatus enabling transmission and reception, via one cable, of the DC power signal, clock signal, control signal, and RF/IF signal, based on a TDMA scheme and FDMA scheme. According to an embodiment of the present invention, the DC power signal and the RF/IF signal may be divided based on the FDMA scheme, and the control signal and clock signal may be divided based on the TDMA scheme, and the signals may then be transmitted and received.

The internal structure of a signal transmission/reception apparatus, according to an embodiment of the present invention, is described with reference to FIG. 4.

Figure 4:
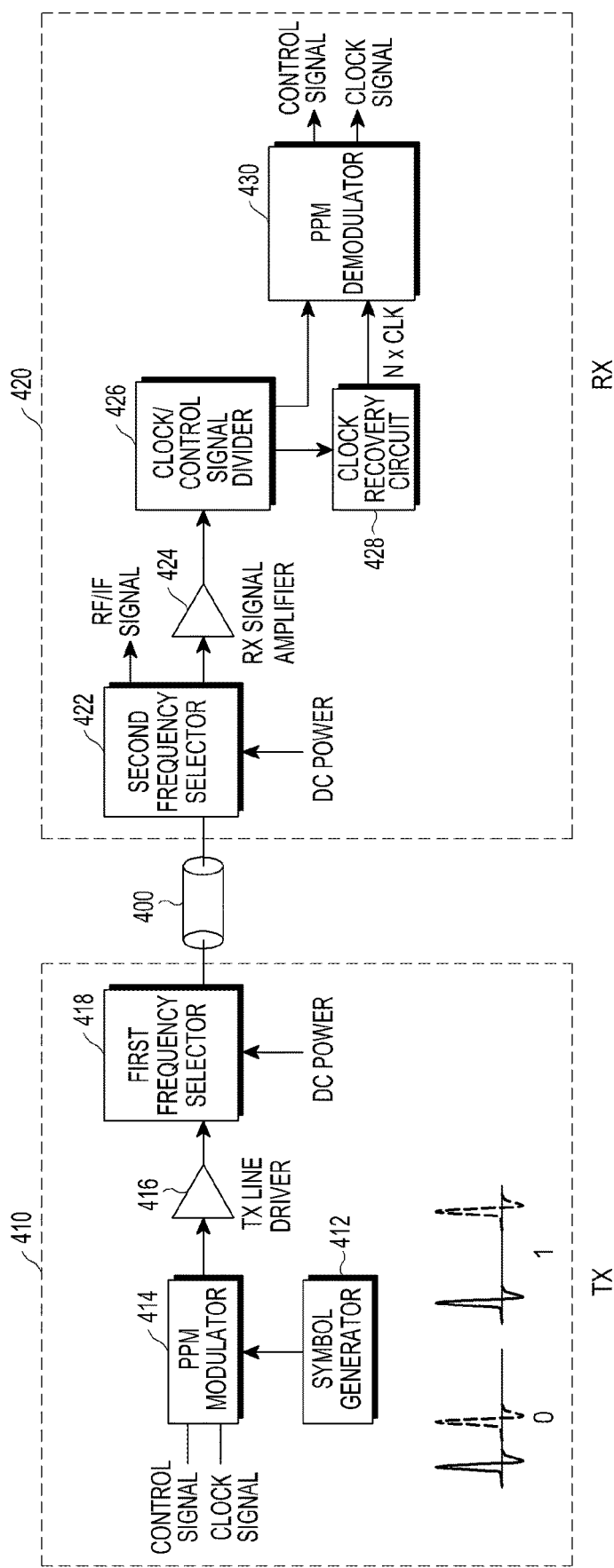
FIG. 4 is a view schematically illustrating the internal structure of a signal transmission/reception apparatus according to an embodiment of the present invention.

FIG. 4 is a view schematically illustrating the internal structure of a signal transmission/reception apparatus according to an embodiment of the present invention.

Referring to FIG. 4, a transmitter 410 and a receiver 420 each may be one of the RFA and the RFB and are connected together via one cable 400. The transmitter 410 includes a symbol generator 412, a pulse position modulation (PPM) modulator 414, a transmit (TX) line driver 416, and a first frequency selector 418.

If the control signal and clock signal are input to the PPM modulator 414, the symbol generator 412 generates a symbol (pulse signal) corresponding to the control signal and clock signal and outputs the symbol to the PPM modulator 414.

The PPM modulator 414 modulates and outputs the control signal and control signal, together, using a TDMA scheme based on the symbol of the control signal and clock signal generated by the symbol generator 412. That is, the PPM modulator 414 assigns the control signal and clock signal to different time slots and outputs so that the control signal and clock signal are transmitted at different times. Here, the time slot is merely an example of a unit time, e.g., unit of time, and the time unit may also be implemented in various forms, such as subframe, frame, or superframe, as well as the time slot.

Meanwhile, for example, the PPM modulator 414 periodically assigns the clock signal to preset time slots and assigns the control signal to a time between the time slots assigned to the clock signal and outputs them.

The TX line driver 416 amplifies the modulated signal (hereinafter, a 'PPM signal') and outputs to the first frequency selector 418. The first frequency selector 418 receives the PPM signal, the RF/IF signal, and the DC power signal and divides the PPM signal, the RF/IF signal, and the DC power signal using filters capable of differentiating the PPM signal, the RF/IF signal, and the DC power signal. The first frequency selector 418 transmits the PPM signal, the RF/IF signal, and the DC power signal through the cable 400 to the receiver 420.

The receiver 420 includes a second frequency selector 422, a receive (RX) signal amplifier 424, a clock/control signal divider 426, a clock recovery circuit 428, and a PPM demodulator 430.

The second frequency selector 422 detects the PPM signal, the RF/IF signal, and the DC power signal from the signal received through the cable 400 based on an FDMA scheme. To that end, the second frequency selector 422 may include multiple filters to detect the PPM signal, RF/IF signal, and DC power signal.

Meanwhile, the DC power signal detected by the second frequency selector 422 may be used to supply power to the receiver 420, and the RF/IF signal may be transferred to a separate component (not shown in FIG. 4) and may be demodulated. The PPM signal may be amplified by the receive (RX) signal amplifier 424 and then inputted to the clock/control signal divider 426.

The clock/control signal divider 426 divides the clock signal and the control signal based on the pulse timing position of the PPM signal. The clock signal is outputted to the clock recovery circuit 428. The clock recovery circuit 428 may generate the clock signal into a clock signal with a higher frequency using a phase locked loop (PLL) or delay locked loop (DLL). The control signal outputted from the clock/control signal divider 426 and the clock signal outputted from the clock recovery circuit 428 are demodulated and outputted from the PPM demodulator 430.

Meanwhile, although FIG. 4 illustrates the case where the signal transmission/reception apparatus is implemented in separate units, such as the transmitter 410 and receiver 420, the signal transmission/reception apparatus may also be implemented in a single processor.

Although FIG. 4 illustrates the case where the transmitter 410 is implemented in separate units, such as the symbol generator 412, the PPM modulator 414, the TX line driver 416, and the first frequency selector 418, the transmitter 410 may also be implemented so that at least two of the symbol generator 412, the PPM modulator 414, the TX line driver 416, and the first frequency selector 418 are integrated together. Further, the transmitter 410 may also be implemented in a single processor.

Further, although FIG. 4 illustrates the case where the receiver 420 is implemented in separate units, such as the second frequency selector 422, the receive (RX) signal amplifier 424, the clock/control signal divider 426, the clock recovery circuit 428, and the PPM demodulator 430, the receiver 420 may also be implemented so that at least two of the second frequency selector 422, the receive (RX) signal amplifier 424, the clock/control signal divider 426, the clock recovery circuit 428, and the PPM demodulator 430 are integrated together. Further, the receiver 420 may also be implemented in a single processor.

The internal structure of the signal transmission/reception apparatus, according to an embodiment of the present invention, has been described with reference to FIG. 4. The internal structure of the first frequency selector 418 and the second frequency selector 422 is now described with reference to FIG. 5.

Figure 5:
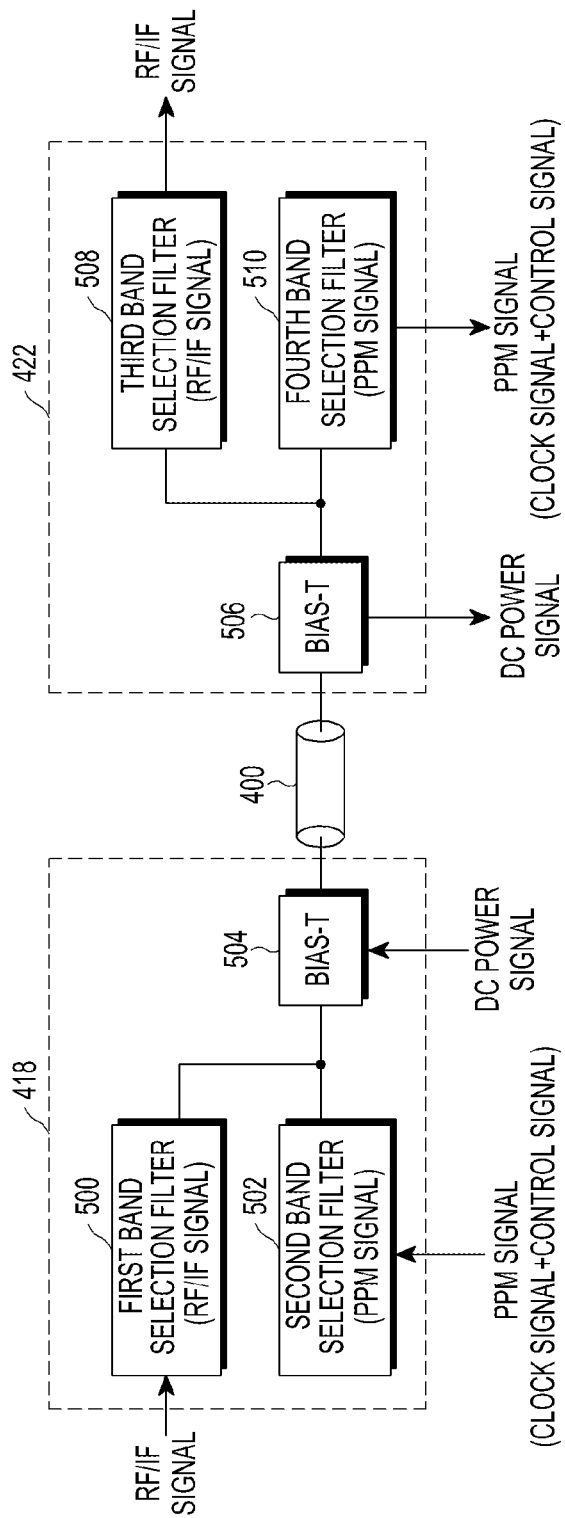
FIG. 5 is a view illustrating the internal structure of a first and second frequency selector according to an embodiment of the present invention.

FIG. 5 is a view schematically illustrating the internal structure of a first and second frequency selector according to an embodiment of the present invention.

Referring to FIG. 5, the first frequency selector 418 includes a first band selection filter 500, a second band selection filter 502, and a bias-T 504. The first band selection filter 500 detects the RF/IF signal from among the signals inputted to the first frequency selector 418 and outputs the RF/IF signal. The second band selection filter 502 detects the PPM signal from among the signals inputted to the first frequency selector 418 and outputs the PPM signal. Further, the bias-T 504 detects the DC power signal from among the signals inputted to the first frequency selector 418 and outputs the DC power signal.

Figure 6:
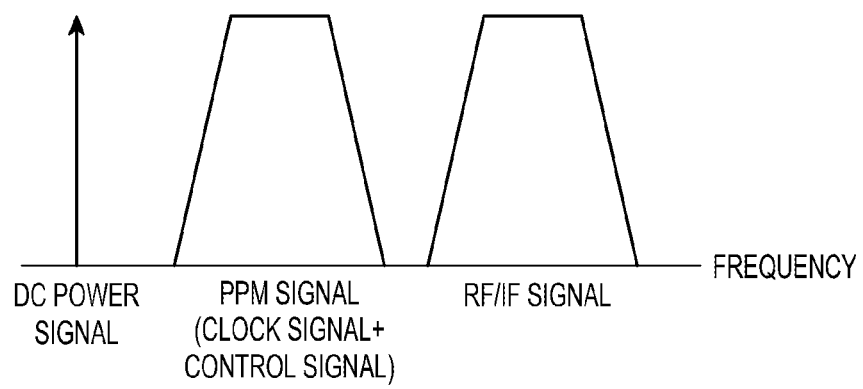
FIG. 6 is a graph illustrating the frequency band of a DC power signal, a PPM signal, and a RF/IF signal according to an embodiment of the present invention.

As shown in FIG. 6, since the RF/IF signal, PPM signal, and DC power signal are signals of different frequency bands, the first band selection filter 500, the second band selection filter 502, and the bias-T 504 may detect the corresponding signals using a filter based on the frequency band of each signal to be detected. Here, FIG. 6 is a graph illustrating the frequency band of a DC power signal, a PPM signal, and a RF/IF signal according to an embodiment of the present invention. In particular, since the DC power signal is a signal of a very low frequency band which is close to 0 GHz, and the RF/IF signal is a signal of a very high frequency band close to 28 GHz or a mmWave band, frequency interference between the DC power signal and the RF/IF signal is small, allowing the filter to be designed in a very simplified manner.

The signals outputted from the first band selection filter 500, the second band selection filter 502, and the bias-T 504 are transmitted to the second frequency selector 422 of the receiver 420 via the cable 400.

The second frequency selector 422 includes a bias-T 506, a third band selection filter 508, and a fourth band selection filter 510. The bias-T 506 detects the DC power signal from among the signals inputted to the second frequency selector 422 and outputs the DC power signal. The third band selection filter 508 detects the RF/IF signal from among the signals inputted to the second frequency selector 422 and outputs the RF/IF signal. The fourth band selection filter 510 detects the PPM signal from among the signals inputted to the second frequency selector 422 and outputs the PPM signal.

Like the first band selection filter 500, the second band selection filter 502, and the bias-T 504 as described above, the third band selection filter 508, the fourth band selection filter 510, and the bias-T 506 may detect the corresponding signals using a filter based on the frequency band of each signal to be detected.

Further, although FIG. 5 illustrates the case where the first frequency selector 418 is implemented in separate units, such as the first band selection filter 500, the second band selection filter 502, and the bias-T 504, the first frequency selector 418 may also be implemented so that at least two of the first band selection filter 500, the second band selection filter 502, and the bias-T 504 are integrated together. Further, the first frequency selector 418 may also be implemented in a single processor.

Further, although FIG. 5 illustrates the case where the second frequency selector 422 is implemented in separate units, such as the bias-T 506, the third band selection filter 508, and the fourth band selection filter 510, the second frequency selector 422 may also be implemented so that at least two of the bias-T 506, the third band selection filter 508, and the fourth band selection filter 510 are integrated together. Further, the second frequency selector 422 may also be implemented in a single processor. Meanwhile, the PPM signal outputted from the second frequency selector 422 may be amplified and inputted to the clock/control signal divider 426. Hereinafter, the internal structure of the clock/control signal divider 426 is described with reference to FIG. 7.

Figure 7:
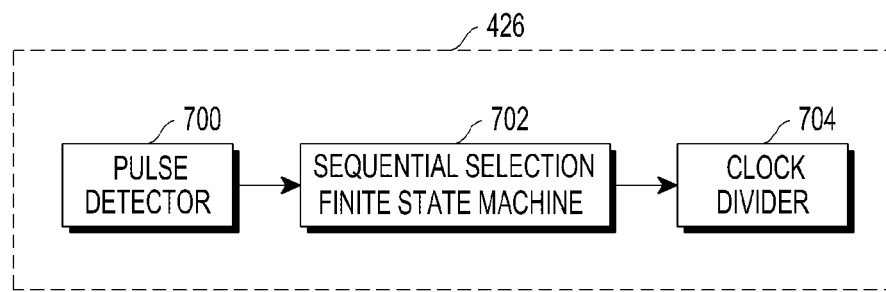
FIG. 7 is a view illustrating the internal configuration of a clock/control signal divider according to an embodiment of the present invention.

FIG. 7 is a view schematically illustrating the internal configuration of a clock/control signal divider according to an embodiment of the present invention.

Referring to FIG. 7, the clock/control signal divider 426 includes a pulse detector 700, a sequential selection finite state machine 702 using a toggle flip flop, and a clock divider 704. When the PPM signal is inputted, the pulse detector 700 detects the pulse signal from the PPM signal. The pulse detector 700 determines that a first pulse signal generated in each time interval (each cycle) is a clock signal and determines that a second pulse signal generated in each time interval is a control signal. Since the clock signal is a periodic signal generated at each time interval, the timing position of the first pulse signal generated at each time interval may be the same. In contrast, the timing position of the second pulse signal generated at each time interval may be varied, and the control signal may have a value, 0 or 1, depending on the corresponding timing position.

The sequential selection finite state machine 702 varies the output value whenever receiving the pulse signal corresponding to the clock signal from the pulse detector 700. For example, when the pulse signal corresponding to the clock signal is inputted with 1 (or 0) outputted as the first output value, the sequential selection finite state machine 702 may output 0 (or 1) as the second output value. The output value of the sequential selection finite state machine 702 is used as a value of the clock signal.

The clock divider 704, if the clock signal having the value generated by the sequential selection finite state machine 702 is outputted, detects signals sequentially generated in response to only the rising edge of the clock signal. Where the clock signal and two or more data are sent, there may be needed a finite state machine sequentially selecting three or more pulse signals, as well as simply the toggle flip flop.

Although FIG. 7 illustrates the case in which the clock/control signal divider 426 is implemented in separate units, such as the pulse detector 700, the sequential selection finite state machine 702, and the clock divider 704, the clock/control signal divider 426 may also be implemented so that at least two of the pulse detector 700, the sequential selection finite state machine 702, and the clock divider 704 are integrated together. Further, the clock/control signal divider 426 may also be implemented in a single processor.

The internal structure of the clock/control signal divider, according to an embodiment of the present invention, has been described with reference to FIG. 7. Now described with reference to FIG. 8 are a clock signal and control signal detected from a PPM signal according to an embodiment of the present invention.

Figure 8:
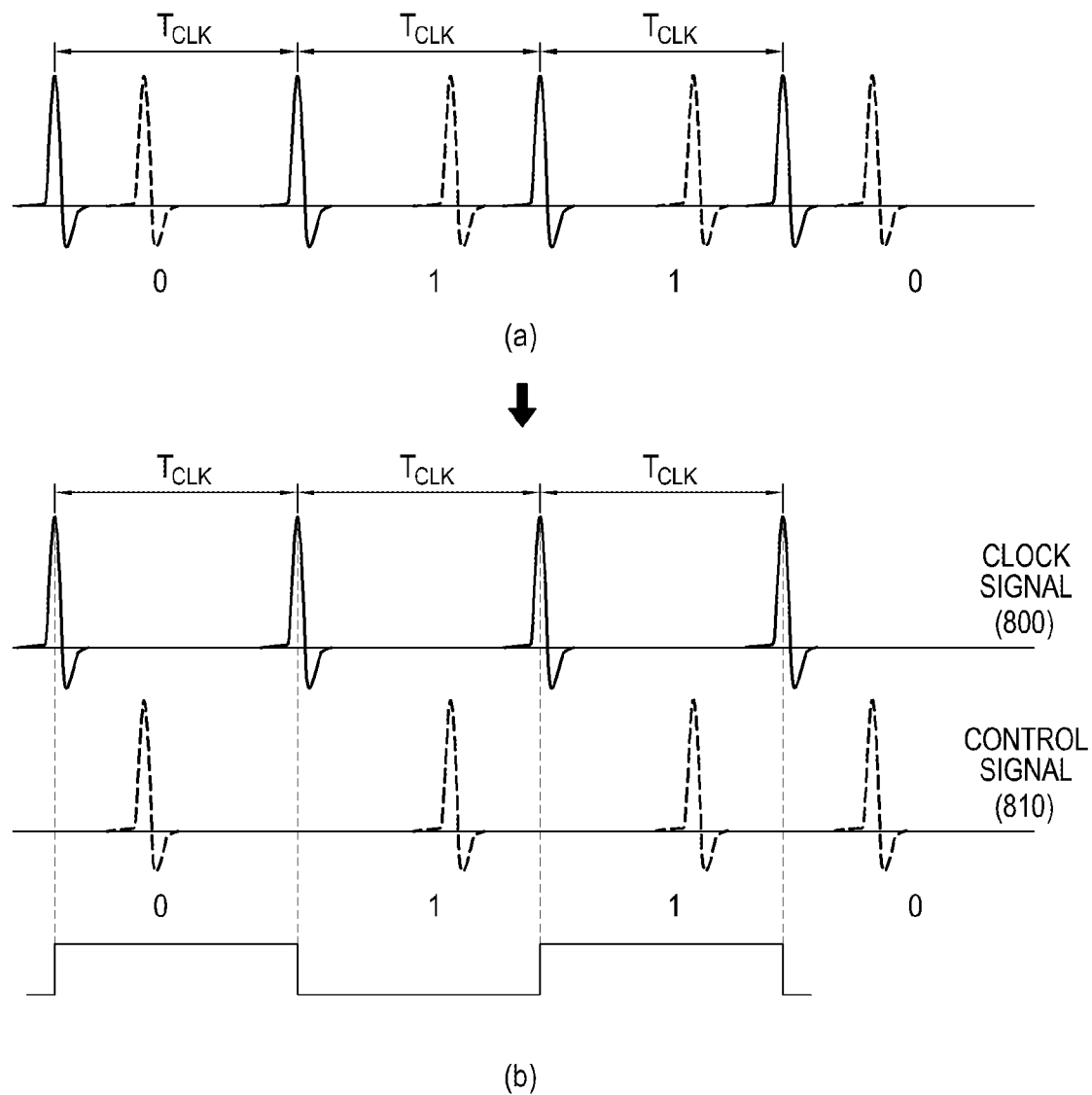
FIG. 8 is a view illustrating a clock signal and control signal detected from a PPM signal according to an embodiment of the present invention.

FIG. 8 is a view illustrating a clock signal and control signal detected from a PPM signal according to an embodiment of the present invention.

As shown in FIG. 8(a), when the PPM signal is inputted, the clock signal 800 and the control signal 810 are divided by the clock/control signal divider 426 as shown in FIG. 8(b). Specifically, the first pulse signal generated at each time interval in FIG. 8(a) is detected as the clock signal 800. The clock signal 800 may be detected at each preset period (TCLK). Further, the value of the clock signal 800 may repeatedly be shown as 0 and 1 (or 1 and 0) by the toggle flip flop 702 in the clock/control signal divider 426.

In FIG. 8(a), the second pulse signal generated at each time interval is detected as the control signal 810. The control signal 810 has a value, 0 or 1. For example, the pulse signal generated a first time after the time of occurrence of the pulse signal corresponding to the clock signal 800 at each time interval may represent the control signal of 0, and the pulse signal generated a second time after the time of occurrence of the pulse signal corresponding to the clock signal 800 may represent the control signal of 1. The first time and the second time denote different times. The first time may be longer or shorter than the second time. In FIGS. 8(a) and (b), the first time is shown to be shorter than the second time.

Meanwhile, although the control signal is described as being binary-encoded, the control signal may also be n-ary encoded to present a higher data rate. In this case, n bits per time interval may be transmitted as the value of the control signal. For example, rather than one bit being transmitted at each time interval as the value of the control signal as shown in FIG. 8, two bits per time interval may be sent as the value of the control signal as shown in FIG. 9.

The clock signal and control signal detected from the PPM signal, according to an embodiment of the present invention, have been described with reference to FIG. 8. An example in which two bits are sent at each time interval as a control signal is described below with reference to FIG. 9, according to an embodiment of the present invention.

Figure 9:
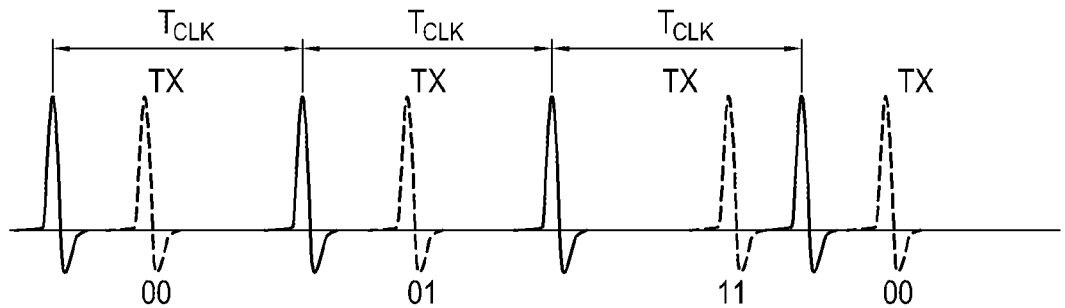
FIG. 9 is a view illustrating an example in which two bits are transmitted as a control signal in each time interval according to an embodiment of the present invention.

FIG. 9 is a view illustrating an example in which two bits are transmitted as a control signal in each time interval according to an embodiment of the present invention.

Referring to FIG. 9 the pulse signals respectively generated a first time, second time, third time, and fourth time after the time of occurrence of the clock signal at each time interval may represent the control signals 00, 01, 10, and 11, respectively. The first time to the fourth time denote different times. For example, "first time<second time<third time<fourth time."

FIG. 9 shows an example in which the control signals having the values, 00, 01, 11, and 00 are sent. As such, where two bits are transmitted during one time interval, the data transmission speed is increased and data rate may be enhanced as compared with when one bit is transmitted. Further, more delicate pulse signals may be generated with respect to the PPM signal. Thus, the clock/control signal divider 426 may be required to detect and recover the clock signal with a higher performance as compared with when the control signal having a one-bit value is sent.

An example in which two bits are sent as the control signal at each time interval has been described with reference to FIG. 9, according to an embodiment of the present invention. Now described with reference to FIG. 10 is an example of bi-lateral transmission symmetrically performed according to an embodiment of the present invention.

Figure 10:
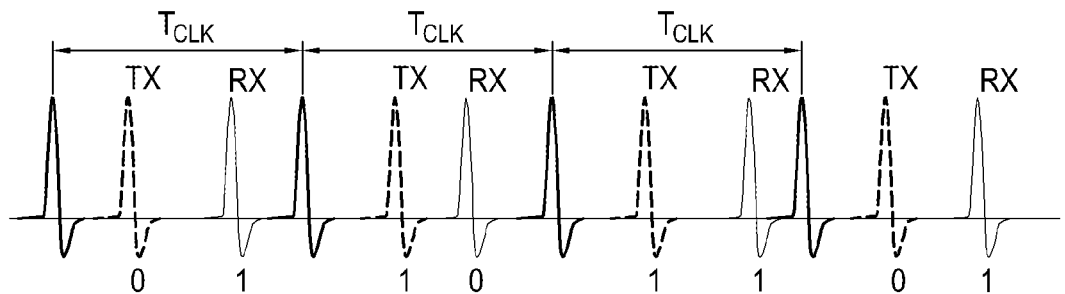
FIG. 10 is a view illustrating an example of bi-lateral transmission symmetrically performed according to an embodiment of the present invention.

FIG. 10 is a view illustrating an example of bi-lateral transmission symmetrically performed according to an embodiment of the present invention.

Referring to FIG. 10, according to an embodiment of the present invention, since the clock signal is always transmitted while the control signal is multiplexed and transmitted at a time different from the time that the clock signal is transmitted, bi-lateral communication is rendered possible. The clock signal may periodically be transmitted, and the control signal (or data) may be transmitted regardless of the transmission of the clock signal. For example, as a time slot for transmission (TX) and a time slot for reception (RX) are assigned after the time slot where the clock signal is assigned in each time interval, bi-lateral transmission between the transmitter and the receiver is made possible. Here, the transmitter and the receiver both send data of a one-bit value and they thus have the same data rate. Thus, the bi-lateral communication shown in FIG. 9 may be seen as being symmetrically performed.

An example of bi-lateral transmission performed symmetrically, according to an embodiment of the present invention, has been described with reference to FIG. 10. An example of bi-lateral transmission performed asymmetrically, according to an embodiment of the present invention, is now described with reference to FIG. 11.

Figure 11:
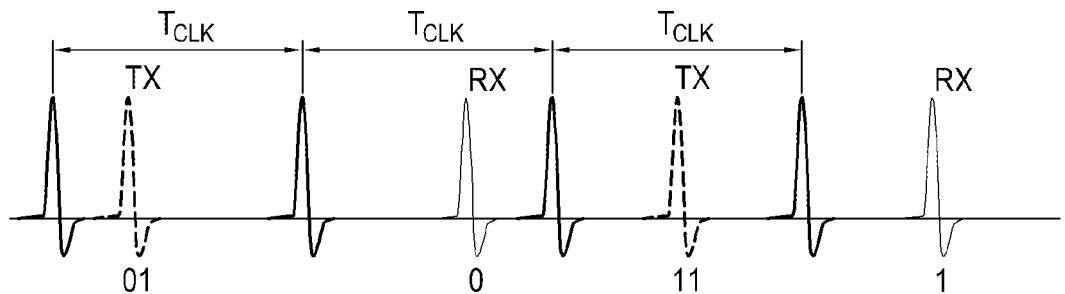
FIG. 11 is a view illustrating an example of bi-lateral transmission asymmetrically performed according to an embodiment of the present invention.

FIG. 11 is a view illustrating an example of bi-lateral transmission asymmetrically performed according to an embodiment of the present invention.

Referring to FIG. 11, where the transmitter and the receiver have different data rates, asymmetrical bi-lateral transmission may be performed. For example, where the data rate of the transmitter is two times larger than the data rate of the receiver, the transmitter may send two bits per two time intervals, and the receiver may send one bit per time interval.

As such, according to an embodiment of the present invention, the transmitter and the receiver may perform bi-lateral communication, and even where the transmitter and the receiver have different data rates, bi-lateral communication may easily be performed. Further, various values may be set to the number of bits that may be transmitted from the transmitter and the receiver during one time interval. Also, various methods for assigning time slots may be implemented, e.g., so assigning time slots as to enable N times of transmission to be performed by the receiver after N times of transmission have been performed by the transmitter. In such case, a finite state machine, not the toggle flip flop, is required that sequentially selects two or more pulse signals.

According to an embodiment of the present invention, various links may be designed depending on the data transmission speed of the transmitter and the receiver and a desired performance of clock signal. The optimum time division design varies depending on frequency plans and data transmission speeds required. The bit error rate (BER) of a link presents a better performance as the inter-pulse signal interval increases in which case the maximum data transmission speed decreases, however.

Meanwhile, where the clock signal and control signal are transmitted based on a TDMA scheme, the connection structure between the RFA and the RFB in the terminal may be a bus structure. This is described in detail with reference to FIG. 12.

Figures 12A, 12B:
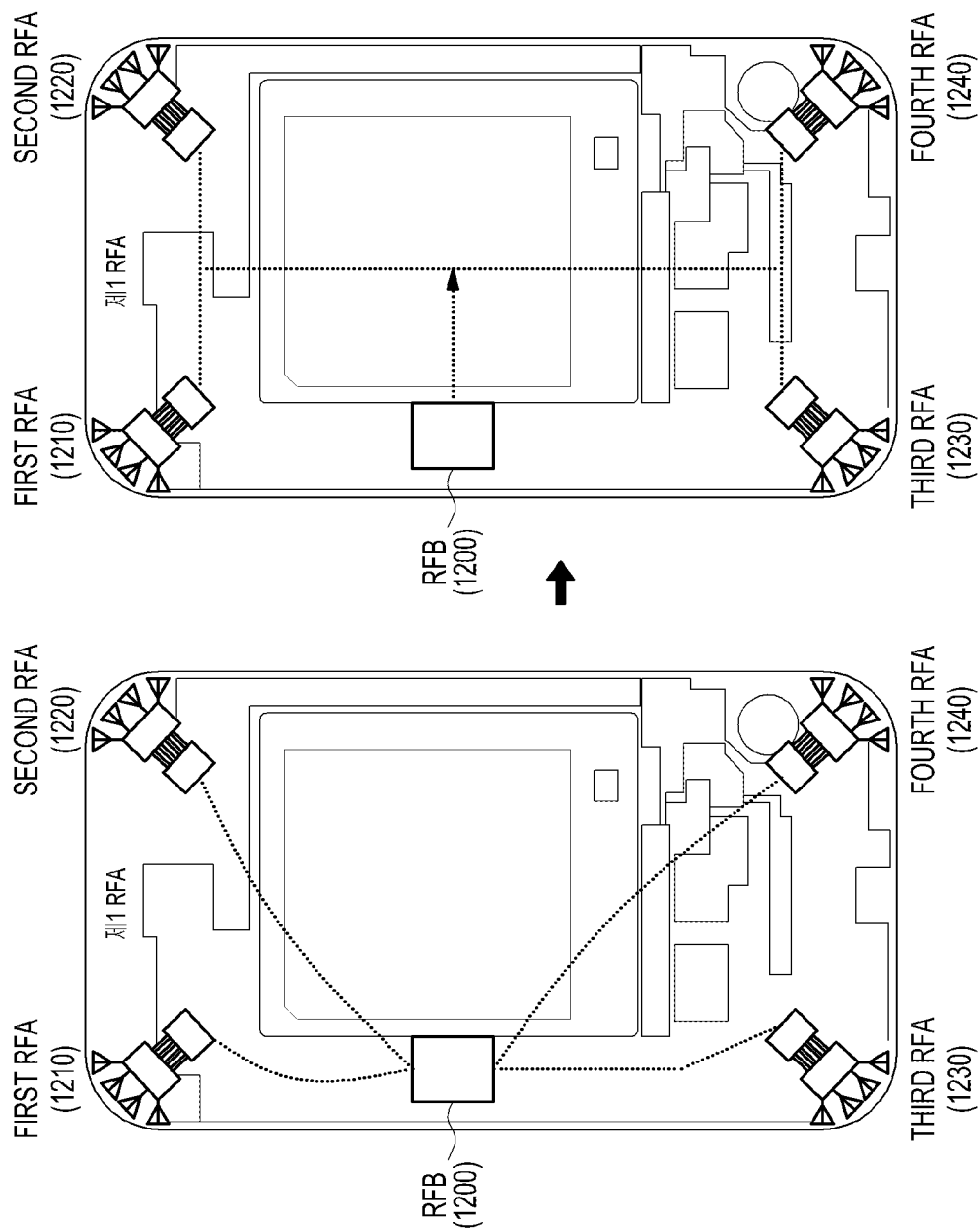
FIG. 12 is a view illustrating the structure of a connection between a RFA and a RFB according to an embodiment of the present invention.

FIG. 12 is a view illustrating the structure of a connection between a RFA and a RFB according to an embodiment of the present invention.

Where a signal transmission/reception method is used that is based on a normal frequency division scheme, the RFB 1200 transmitting signals should perform as many signal transmission operations as the number of RFAs that are supposed to receive the signals, as shown in FIG. 12(a). In other words, the RFB 1200 should carry out four signal transmission operations via cables respective connected with a first RFA 1210, a second RFA 1220, a third RFA 1230, and a fourth RFA 1240.

However, in the case of using such method that the control signal and clock signal are multiplexed based on a TDMA scheme and transmitted, according to an embodiment of the present invention, although the RFB 1200 performs one signal transmission operation based on the bus structure as shown in FIG. 12(*b*), the first RFA 1210, the second RFA 1220, the third RFA 1230, and the fourth RFA 1240 each may receive a corresponding signal. The bus structure denotes a structure in which a transmission line of the RFB 1200 is connected to a single line connected with the first RFA 1210, the second RFA 1220, the third RFA 1230, and the fourth RFA 1240.

The RFB 1200 may send a signal which is common to all of the first RFA 1210, the second RFA 1220, the third RFA 1230, and the fourth RFA 1240, as the clock signal, allowing the RFAs to be synced together. The RFB 1200 may assign different time slots to the respective control signals for the first RFA 1210, the second RFA 1220, the third RFA 1230, and the fourth RFA 1240 and send the control signals so that the first RFA 1210, the second RFA 1220, the third RFA 1230, and the fourth RFA 1240 may receive their corresponding signals at the time slots respectively assigned thereto.

Figure 13A:
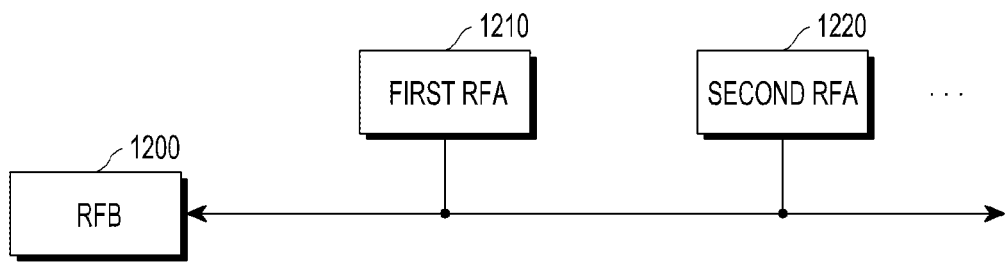
FIG. 13 is a view illustrating signals transmitted from a RFB to RFAs based on a bus structure according to an embodiment of the present invention.
Figure 13B:
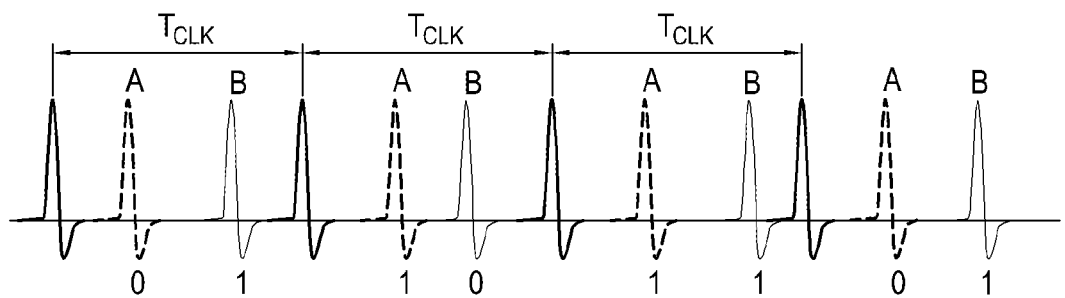

Now described with reference to FIG. 13 are signals transmitted from a RFB to RFAs based on a bus structure according to an embodiment of the present invention.

FIG. 13 is a view illustrating signals transmitted from a RFB to RFAs based on a bus structure according to an embodiment of the present invention.

As shown in FIG. 13(*a*), the RFB 1200 may be connected with the first RFA 1210 and the second RFA 1220 via the bus structure. In this case, the RFB 1200 sends the PPM signal to the first RFA 1210 and the second RFA 1220 as shown in FIG. 13(*b*).

Specifically, the clock signal is a signal jointly used by the first RFA 1210 and the second RFA 1220. The first RFA 1210 and the second RFA 1220 detect the clock signal from the PPM signal and perform a sync operation.

As the respective control signals for the first RFA 1210 and the second RFA 1220 are assigned to time slots positioned after the time slot that the clock signal is transmitted at each time interval, the first RFA 1210 and the second RFA 1220 receive the control signals of the time slots respectively assigned corresponding thereto. The time slots assigned corresponding to the first RFA 1210 and the second RFA 1220, respectively, differ from each other. FIG. 13(*b*) illustrates an example in which the time slot A assigned corresponding to the first RFA 1210 comes ahead of the time slot B assigned corresponding to the second RFA 1220.

An example in which the RFB 1200 is connected with the first RFA 1210 and the second RFA 1220 via the bus structure has been described in connection with FIG. 13. However, where the RFB 1200 is connected with the first RFA 1210, the second RFA 1220, the third RFA 1230, and the fourth RFA 1240 via the bus structure as shown in FIG. 12, time slots assigned corresponding to the third RFA 1230 and the fourth RFA 1240 may be added to the time slots A and B assigned corresponding to the first RFA 1210 and the second RFA 1220 in FIG. 13(*b*).

Signals transmitted from the RFB to the RFAs based on the bus structure have been described with reference to FIG. 13, according to an embodiment of the present invention.

The waveform of a pulse signal, according to an embodiment of the present invention, is now described with reference to FIG. 14.

Figure 14A:
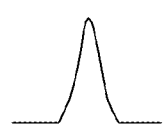
FIG. 14 is a view illustrating a waveform of pulse signal according to an embodiment of the present invention.
Figure 14B:
Figure 14C:
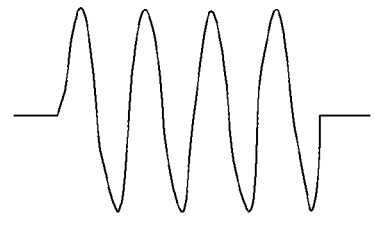

FIG. 14 is a view illustrating a waveform of pulse signal according to an embodiment of the present invention.

The pulse signal used as a unit symbol may have various waveforms depending on applications. According to an embodiment of the present invention, the frequency component of the PPM signal is varied depending on the waveform of the pulse signal and the pulse repetition frequency (PRF). Accordingly, different waveforms of pulse signals may be used according to uses.

For example, where no DC power signal need to be transmitted (i.e., the case where the clock signal and control signal are transmitted up to the area where the frequency is 0), a mono-pulse waveform of pulse signal may be used as shown in FIG. 14(*a*).

Where the DC power signal needs to be transmitted, a DC balanced symbol should be used. Thus, a bi-pulse or multi-period pulse waveform of pulse signal may be used as shown in FIGS. 14(*b*) and (*c*).

The waveform of pulse signal to be used may also be determined given the data transmission speed. To increase the data transmission speed, a mono-pulse waveform of pulse signal with short symbol duration may be used. Where the mono-pulse waveform of pulse signal is used, power consumption may be reduced.

As the width of pulse signal decreases, the signal may be deemed to be a wide-band signal. Thus, where several signals are mixed or the frequency of RF signal is low so that the bandwidth needs to be reduced, a multi-period pulse waveform of pulse signal may be used.

Where the multi-period pulse waveform of pulse signal is used, the spectrum of the pulse signal is substantially narrowed, and thus, interference with other signals may be decreased. However, since the period of occurrence of the pulse signal increases, the overall data rate reduces, and power consumption also increases.

As set forth above, since the pulse signal has different characteristics depending on its waveforms, it is material to determine a pulse signal of a proper waveform depending on given applications or uses. This is described with reference to FIG. 15.

Figure 15:
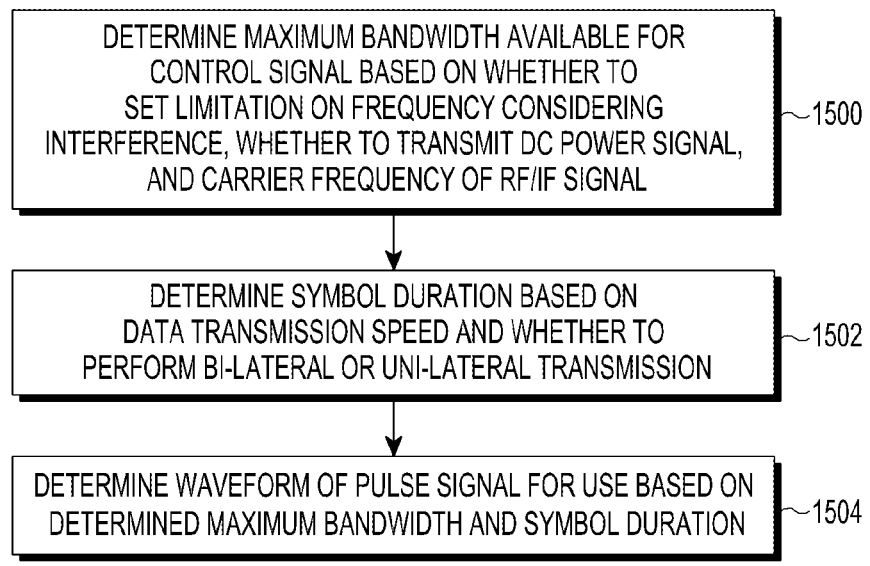
FIG. 15 is a flowchart illustrating a process for determining a waveform of pulse signal according to an embodiment of the present invention.

FIG. 15 is a flowchart illustrating a process for determining a waveform of pulse signal according to an embodiment of the present invention.

Referring to FIG. 15, the transmitter determines a maximum bandwidth available for the control signal based on whether to set a frequency limitation (e.g., limiting the lowest frequency) considering whether the DC power signal is transmitted or not, the carrier frequency of RF/IF signal and interference, in step 1500.

In step 1502, the transmitter determines symbol duration for one bit depending on a data transmission speed required and which one of bi-lateral and uni-lateral transmission is performed. Step 1502 may be performed prior to step 1500.

In step 1504, the transmitter determines a waveform of pulse signal to be used based on the determined maximum bandwidth and symbol duration. That is, the transmitter determines one, for use, of the mono-pulse waveform, the bi-pulse waveform, and the multi-period pulse waveform.

The above determination method may be performed once for the first time or adaptively according to link statuses. In the latter case, the transmitter and the receiver are connected via one cable and are implemented to be able to use pulse signals of the mono-pulse waveform, bi-pulse waveform, and multi-period pulse waveform so that the pulse signal of the optimal waveform fitting the link status may then be selected and used.

For example, where the control speed needs to be high for the purpose of, e.g., beam calibration and automatic gain control, the transmitter may send a pulse signal of waveform suitable for high data transmission speed and uni-lateral transmission. Where the control speed needs to slow down due to, e.g., entry into power saving mode, the transmitter may send a pulse signal of waveform appropriate for low data transmission speed. Since the data transmission speed and power consumption vary depending on the waveform of each pulse signal, the selection and use of the optimum waveform of pulse signal may lead to a reduction in the overall system overhead.

Meanwhile, although FIG. 15 illustrates a process for determining the waveform of a pulse signal according to an embodiment of the present invention, other changes may also be made to FIG. 15. As an example, although the continuous steps are shown in FIG. 15, the steps in FIG. 15 may overlap or arise in parallel or in different order, or several number of times.

A wireless communication unit in a terminal may be provided separately into a component for high-frequency processing and a component for intermediate-frequency processing, and the components may be connected together via one cable. In this case, according to an embodiment of the present invention, control signals and clock signals are transmitted and received based on a TDMA scheme, and DC power signals and RF/IF signals may be transmitted and received based on an FDMA scheme. The use of such signal transmission/reception scheme may reduce the complexity in the design of a frequency selector and the operation of differentiating signals and address an increase in jitter due to clock signals.

Further, according to an embodiment of the present invention, control signals and clock signals are transmitted on a pulse basis, which reduces interference with other frequency bands of signals and resolve electromagnetic interference (EMI) issues. Further, according to an embodiment of the present invention, various pulse symbols are rendered to be used given data transmission speed and power consumption. Thus, overhead in the system may decrease.

Further, according to an embodiment of the present invention, signal transmission and reception may be rendered possible to reduce complexity by distinctively transmitting/receiving multiple signals.

Further, according to an embodiment of the present invention, control signals and clock signals may be transmitted and received based on time division multiple access (TDMA), and DC power signals and RF/IF signals may be transmitted and received based on frequency division multiple access (FDMA).

Further, according to an embodiment of the present invention, interference with signals transmitted/received through other frequency bands may be reduced by transmitting control signals and clock signals on a pulse basis, and various pulse symbols may be rendered to be used considering, e.g., data transmission speed and power consumption.

Particular aspects of the present invention may be implemented as computer readable codes in a computer readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain various embodiments of the present invention may be readily interpreted by skilled programmers in the art to which the present invention pertains.

The apparatuses and methods according to embodiments of the present invention may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to embodiments of the present invention may be implemented by a computer or a portable terminal including a controller and a memory, and the memory may be an exemplary machine-readable storage medium that may properly retain program(s) containing instructions for implementing the embodiments of the present invention.

Accordingly, the present invention encompasses a program containing codes for implementing the device or method set forth in the claims of this invention and a machine (e.g., computer)-readable storage medium storing the program. The program may be electronically transferred via any media such as communication signals transmitted through a wired or wireless connection and the present invention properly includes the equivalents thereof.

The apparatuses according to embodiments of the present invention may receive the program from a program providing device wiredly or wirelessly connected thereto and store the same. The program providing apparatus may include a memory for storing a program including instructions enabling a program processing apparatus to perform a preset signal transmission/reception method and information necessary for the signal transmission/reception method, a communication unit for performing wired or wireless communication with a graphic processing apparatus, and a controller transmitting the program to the graphic processing apparatus automatically or as requested by the graphic processing apparatus.

Although specific embodiments of the present invention have been described above, various changes may be made thereto without departing from the scope of the present invention. Thus, the scope of the present invention should not be limited to the above-described embodiments, and should rather be defined by the following claims and equivalents thereof.

The invention claimed is:

1. A method of transmitting a signal by a first apparatus, the method comprising the steps of:
   generating a pulse signal including a clock signal for obtaining synchronization with at least one second apparatus and a control signal for controlling the at least one second apparatus; and
   transmitting, to the at least one second apparatus, the pulse signal including the clock signal and the control signal, a radio frequency (RF) signal for communication with a base station, and a power signal for supplying power to the at least one second apparatus,
   wherein the clock signal and the control signal are assigned to different time units, wherein the clock signal is assigned to a preset time unit, and the control signal is assigned to one of multiple time units based on a value included in the control signal, wherein the multiple time units include time units included between time units to which the clock signal is assigned, and wherein each of the pulse signal, the RF signal, and the power signal is transmitted at different frequency bands.

2. The method of claim 1, wherein in a case where a number of the at least one second apparatus is equal to or greater than two, the clock signal is assigned to a preset time unit, control signals generated corresponding to the at least one second apparatus, respectively, are assigned to time units respectively designated for the at least one second apparatus among multiple time units.

3. The method of claim 1, wherein a pulse waveform of the pulse signal is determined based on a transmission duration and a maximum bandwidth available for the control signal, and wherein the pulse waveform includes one of a monopulse, a bi-pulse, or a multi-period pulse.

4. The method of claim 3, wherein the maximum bandwidth is determined based on whether to transmit the power signal for supplying the power to the at least one second apparatus, a lowest frequency available for the control signal, and a frequency to be used to transmit the RF signal, and the transmission duration is determined based on a transmission speed of the control signal and whether uni-lateral transmission is performed by the at least one second apparatus or bi-lateral transmission is performed by the first apparatus and the second apparatus.

5. A method of receiving a signal by a second apparatus, the method comprising the step of:

receiving, from a first apparatus, a pulse signal including a control signal for controlling the second apparatus and a clock signal for obtaining synchronization with the first apparatus, a radio frequency (RF) signal for communication with a base station, and a power signal for supplying power, wherein the clock signal and the control signal are assigned to different time units, wherein the clock signal is assigned to a preset time unit, and the control signal is assigned to one of multiple time units based on a value included in the control signal, wherein the multiple time units include time units included between time units to which the clock signal is assigned, and wherein each of the pulse signal, the RF signal, and the power signal is received at different frequency bands.

6. The method of claim 5, wherein the clock signal is commonly used for multiple apparatuses including the second apparatus and connected with the first apparatus, and wherein the control signal is assigned to a time unit designated for the second apparatus among the multiple time units.

7. The method of claim 5, wherein a pulse waveform of the pulse signal is determined based on a transmission duration and a maximum bandwidth available for the control signal, and wherein the pulse waveform is one of a mono-pulse, a bi-pulse, or a multi-period pulse.

8. The method of claim 7, wherein the maximum bandwidth is determined based on whether to transmit the power signal for supplying the power to the second apparatus, a lowest frequency available for the control signal, and a frequency to be used to transmit the RF signal, and the transmission duration is determined based on a transmission speed of the control signal and whether uni-lateral transmission is performed by the second apparatus or bi-lateral transmission is performed by the first apparatus and the second apparatus.

9. An apparatus, comprising:

a pulse signal generator configured to generate a pulse signal including a clock signal for obtaining synchronization with at least one second apparatus and a control signal for controlling the at least one second apparatus; and a transmitter configured to transmit, to the at least one second apparatus, the pulse signal including the clock signal and the control signal, a radio frequency (RF) signal for communication with a base station, and a power signal for supplying power to the at least one second apparatus, wherein the clock signal and the control signal are assigned to different time units, wherein the clock signal is assigned to a preset time unit, and the control signal is assigned to one of multiple time units based on a value included in the control signal, wherein the multiple time units include time units included between time units to which the clock signal is assigned, and wherein each of the pulse signal, the RF signal, and the power signal is transmitted at different frequency bands.

10. The apparatus of claim 9, wherein in a case where a number of the at least one second apparatus is equal to or greater than two, the clock signal is assigned to a preset time unit, control signals generated corresponding to the at least one second apparatus, respectively, are assigned to time units respectively designated for the at least one second apparatus among multiple time units.

11. The apparatus of claim 9, wherein a pulse waveform of the pulse signal is determined based on a transmission duration and a maximum bandwidth available for the control signal, and wherein the pulse waveform is one of a mono-pulse, a bi-pulse, or a multi-period pulse.

12. The apparatus of claim 11, wherein the maximum bandwidth is determined based on whether to transmit the power signal for supplying the power to the at least one second apparatus, a lowest frequency available for the control signal, and a frequency to be used to transmit the RF signal, and the transmission duration is determined based on a transmission speed of the control signal and whether uni-lateral transmission is performed by the at least one second apparatus or bi-lateral transmission is performed by the apparatus and the at least one second apparatus.

13. A second apparatus, comprising:

a receiver configured to receive, from a first apparatus, a pulse signal including a control signal for controlling the second apparatus and a clock signal for obtaining synchronization with the first apparatus, a radio frequency (RF) signal for communication with a base station, and a power signal for supplying power, wherein the clock signal and the control signal are assigned to different time units, wherein the clock signal is assigned to a preset time unit, and the control signal is assigned to one of multiple time units based on a value included in the control signal, wherein the multiple time units include time units included between time units to which the clock signal is assigned, and wherein each of the pulse signal, the RF signal, and the power signal is received at different frequency bands.

14. The second apparatus of claim 13, wherein the clock signal is commonly used for multiple apparatuses including the second apparatus and connected with the first apparatus, and wherein the control signal is assigned to a time unit designated for the second apparatus among the multiple time units.

15. The second apparatus of claim 13, wherein a pulse waveform of the pulse signal is determined based on a transmission duration and a maximum bandwidth available for the control signal, and wherein the pulse waveform is one of a mono-pulse, a bi-pulse, or a multi-period pulse.

16. The second apparatus of claim 15, wherein the maximum bandwidth is determined based on whether to transmit the power signal for supplying the power to the second apparatus, a lowest frequency available for the control signal, and a frequency to be used to transmit the RF signal, and the transmission duration is determined based on a transmission speed of the control signal and whether unilateral transmission is performed by the second apparatus or bi-lateral transmission is performed by the first apparatus and the second apparatus.

* * * * *